(12) United States Patent
Fuchs et al.

(10) Patent No.: US 9,075,248 B2
(45) Date of Patent: Jul. 7, 2015

(54) ARM FOR A PAIR OF GLASSES

(75) Inventors: Gerhard Fuchs, Kauns (AT); Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 0 days.

(21) Appl. No.: 13/516,340

(22) PCT Filed: Jan. 13, 2011

(86) PCT No.: PCT/AT2011/000016
§ 371 (c)(1),
(2), (4) Date: Jun. 15, 2012

(87) PCT Pub. No.: WO2011/091453
PCT Pub. Date: Aug. 4, 2011

(65) Prior Publication Data
US 2012/0287396 A1    Nov. 15, 2012

(30) Foreign Application Priority Data

Jan. 27, 2010  (AT) .................................. A 106/2010

(51) Int. Cl.
*G02C 5/16*    (2006.01)

(52) U.S. Cl.
CPC .............. *G02C 5/16* (2013.01); *G02C 2200/16* (2013.01); *G02C 2200/28* (2013.01)

(58) Field of Classification Search
CPC ........ G02C 5/2209; G02C 5/16; G02C 5/143; G02C 5/10; G02C 5/14; G02C 2200/22; G02C 5/2227; G02C 2200/26; G02C 2200/10; G02C 2200/16; G02C 2200/28; G02C 2200/02; G02C 5/001; G02C 1/08; G02C 5/006; G02C 2200/24

USPC ................. 351/111, 113, 114, 119, 121, 153; 16/228

See application file for complete search history.

(56) References Cited

U.S. PATENT DOCUMENTS

| | | | |
|---|---|---|---|
| 3,654,376 A * | 4/1972 | Lyons, Sr. ..................... | 351/113 |
| 4,377,328 A | 3/1983 | Ferrandi | |
| 7,862,167 B2 | 1/2011 | Parent | |
| 2008/0094569 A1* | 4/2008 | Tabacchi ....................... | 351/113 |

(Continued)

FOREIGN PATENT DOCUMENTS

| CA | 2 028 889 | 5/1992 |
|---|---|---|
| DE | 94 00 967 | 9/1994 |
| DE | 9400967 | * 9/1994 |

(Continued)

OTHER PUBLICATIONS

International Search Report of PCT/AT2011/000016, date of mailing May 4, 2011.

*Primary Examiner* — Thomas K Pham
*Assistant Examiner* — Sharrief Broome
(74) *Attorney, Agent, or Firm* — Collard & Roe, P.C.

(57) ABSTRACT

An arm (3) for a pair of glasses made of two sections (6, 7) is described, which are connected to one another via a coiled spring (10), which forms an arm joint (8) and is enveloped using an elastomeric plastic envelope (9). In order to achieve an advantageous bending behavior for the arm joint (8), it is proposed that the plastic envelope (9) have a differing wall thickness around the circumference, which determines the bending resistance of the arm joint (8) with respect to at least one predefined bending axis.

2 Claims, 2 Drawing Sheets

(56) References Cited

U.S. PATENT DOCUMENTS

2009/0161063 A1* 6/2009 Parent .......................... 351/114
2009/0251658 A1* 10/2009 Antoniacomi ................ 351/113

FOREIGN PATENT DOCUMENTS

| DE | 295 13 032 | | 5/1996 |
| DE | 101 18 019 | | 10/2002 |
| FR | 1 238 393 | | 7/1960 |
| FR | 2 785 058 | | 4/2000 |
| FR | 2785058 A1 | * | 4/2000 |
| FR | 2 899 981 | | 10/2007 |
| GB | 490 050 | * | 8/1938 |
| GB | 490 050 A | * | 8/1938 |
| GB | 490050 A | * | 8/1938 |
| GB | 2 443 325 | | 4/2008 |
| JP | 61-018919 | | 1/1986 |
| LU | 38 897 | | 8/1960 |

* cited by examiner

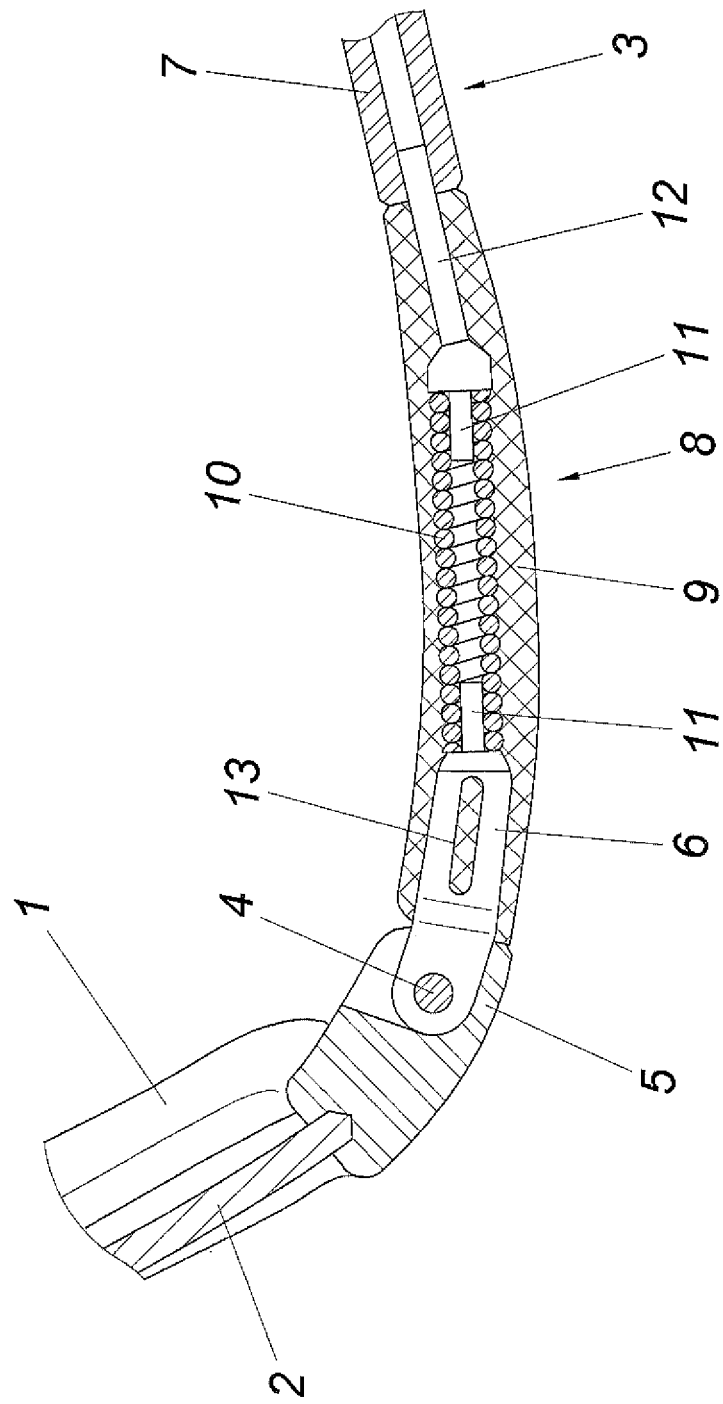

ARM FOR A PAIR OF GLASSES

CROSS REFERENCE TO RELATED APPLICATIONS

This application is the National Stage of PCT/AT2011/000016 filed on Jan. 13, 2011, which claims priority under 35 U.S.C. §119 of Austrian Application No. A 106/2010 filed on Jan. 27, 2010, the disclosure of which is incorporated by reference. The international application under PCT article 21(2) was not published in English.

FIELD OF THE INVENTION

The invention relates to an arm for a pair of glasses made of two sections, which are connected to one another via a coiled spring, which forms an earpiece joint and is enveloped using an elastomeric plastic envelope.

DESCRIPTION OF THE PRIOR ART

In order to improve the hold of a pair of glasses on the head of a glasses wearer, equipping the pair of glasses with spring arms is known, which press with an appropriate resilient pre-tension against the head of a glasses wearer. For this purpose, providing an arm joint in the form of a coiled spring between the arms and the arm cheeks of the glasses has already been proposed (DE 101 18 019 A1, DE 94 00 967 U1). In addition, the arms can be subdivided into two longitudinal sections (DE 94 00 967 U1), which are in turn connected to one another via a coiled spring. To connect the arm cheeks and the arms to the coiled springs, the arm cheeks and arms can coaxially engage using threaded attachments from opposing sides in the coiled springs (DE 101 18 019 A1) or the coiled springs can be inserted into corresponding pocket holes in the arm cheeks and in the arms or in the arm sections (DE 94 00 967 U1). In addition, the coiled springs can be enclosed by an elastomeric envelope (GB 490 050 A), in order to ensure a uniform appearance for the arms. Simple structural conditions do result with the aid of coiled springs as the arm joints, however, the preferred joint axes of an arm of a pair of glasses cannot be taken into consideration by the bending resistance of a coiled spring, which is equal in all directions. It has therefore been proposed (DE 94 00 967 U1) that multiple coiled springs be arranged adjacent to one another parallel in a plane, so that a preferred bending axis perpendicular to the coiled springs and parallel to the common axial plane of the coiled springs results. However, this has the disadvantage that the structural expenditure and the space requirement increase with the provision of multiple parallel coiled springs.

SUMMARY OF THE INVENTION

The invention is therefore based on the object of implementing an arm for a pair of glasses of the type described at the beginning so that the arm joint can be designed for at least one preferred bending direction while maintaining a simple structure.

The invention achieves the stated object in that the plastic envelope has a wall thickness which differs around the circumference and determines the bending resistance of the arm joint with respect to at least one predefined bending axis, Since the bending resistance of the elastomeric plastic envelope is a function, inter alia, of the thickness of the plastic envelope, a preferred bending axis for the arm joint can be predefined by the provision of different wall thicknesses around the circumference, so that in a simple manner the coiled spring of the arm joint can be used for pressing the arm cheek against the head of the glasses wearer with an appropriate pre-tension, and preferably with a higher bending stiffness of the arm joint outside the preferred bending direction. In addition, the plastic envelope absorbs a part of the forces occurring between the arm sections, so that a composite effect results between the coiled spring and the plastic envelope, which is advantageous for the arm stress. This is true in particular if the coiled spring is extrusion coated using an elastomeric plastic.

BRIEF DESCRIPTION OF THE DRAWING

The subject matter of the invention is shown as an example in the drawing. In the figures FIG. 1 shows a pair of glasses according to the invention in detail in the region of an arm joint in a partially cutaway side view and FIG. 2 shows a section along line II-II of FIG. 1.

DESCRIPTION OF THE PREFERRED EMBODIMENT

Figure 1:
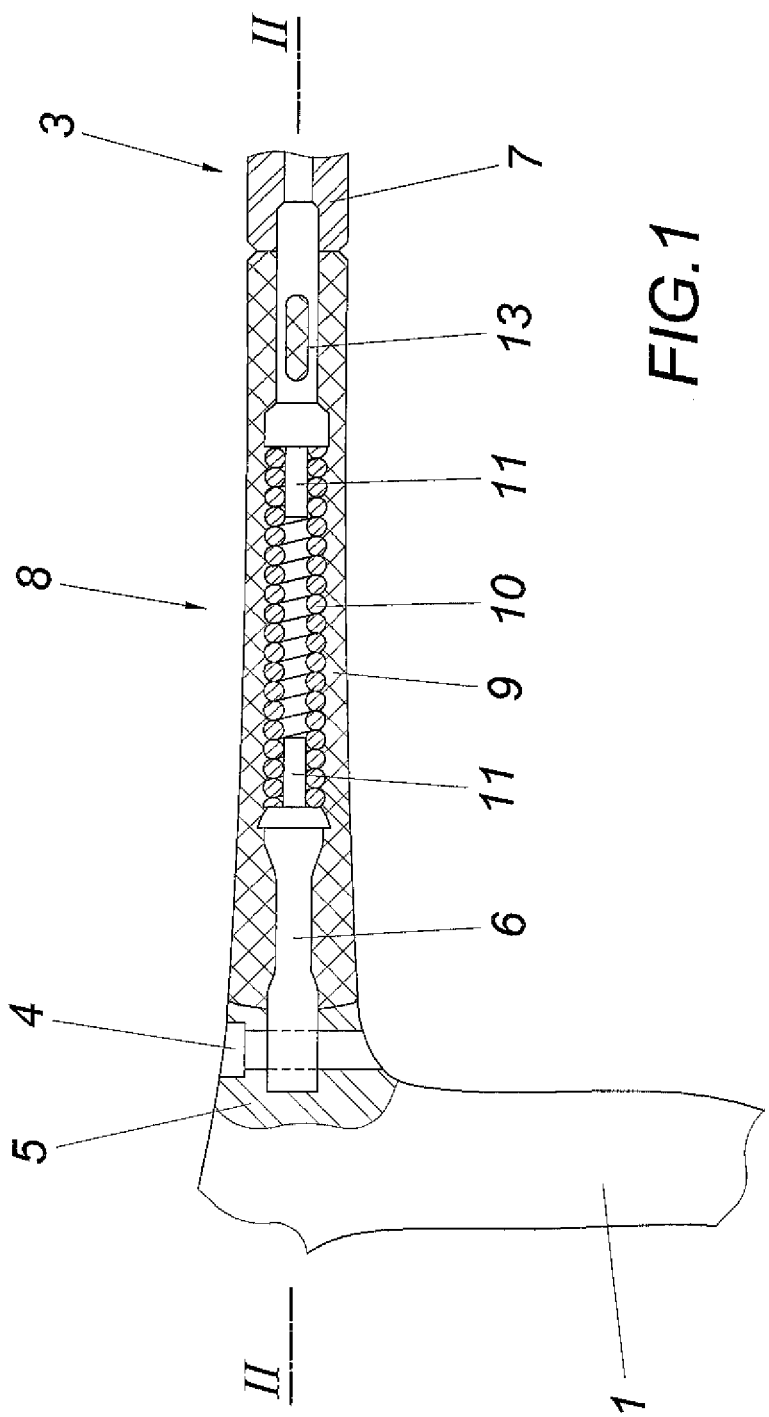

The illustrated pair of glasses has a frame 1 for glasses lenses 2 and two arms 3, which are linked via a hinge joint 4 to arm cheeks 5 of the frame 1. The arm section 6 formed by the arm-side hinge part is connected to the remaining arm section 7 via a resilient arm joint 8, which comprises a coiled spring 10 extrusion coated by a plastic envelope 9. The arrangement is made so that the coiled spring 10 is supported on plug attachments 11 of the hinge-side arm section 6 and the ear-side arm section 7, while the elastomeric plastic envelope 9 additionally encloses, beyond the plug attachments 11, the hinge part of the arm section 6, on one side, and the support insert 12 for the plug attachment 11 on the side of the arm joint 8 opposite to the hinge joint 4, on the other side. Because of the plastic which penetrates openings 13 of the arm section 6 and the support insert 12, a formfitting connection results between these structure parts and the plastic envelope 9, which can also absorb greater tensile stresses of the arm joint 8.

As can be inferred from FIG. 2 in particular, the plastic envelope 9 has a differing wall thickness around the circumference, so that through this differing wall thickness of the plastic envelope 9, the bending resistance of the arm joint 8 can be adapted to a preferred bending behavior with respect to a predefined bending axis. In the present case, this relates in particular to the hold of the glasses on the head of the glasses wearer, which hold is to be improved by pressing on the arms 3 under a resilient pre-tension. With the aid of the composite effect resulting through the coiled spring 10 and the plastic envelope 9 enclosing this coiled spring 10, particularly advantageous conditions can be achieved for the hold of the glasses on the head of the glasses wearer. The plastic envelope 9 enveloping the coiled spring 10 conceals the coiled spring 10 in a visually appealing manner and prevents hairs from catching between the turns of the coiled spring 10.

The invention claimed is:
1. An arm for a pair of glasses, the arm comprising a longitudinal axis, a first longitudinal section, a second longitudinal section, and a coiled spring extending along the longitudinal axis and connecting the first longitudinal section to the second longitudinal section,
wherein the coiled spring forms an arm joint and is enveloped using an elastomeric plastic envelope, wherein the elastomeric plastic envelope has a first circumference, wherein all of the first circumference is disposed in a first plane, wherein the first plane runs perpendicularly through the longitudinal axis of the arm and runs through the coiled spring, wherein the elastomeric plastic envelope has a first wall thickness differing around the first circumference of the arm, and wherein the first wall thickness determines a bending resistance of the arm joint with respect to at least one predefined bending axis of the arm.

2. The arm for a pair of glasses according to claim 1, wherein the coiled spring is extrusion coated using an elastomeric plastic.

\* \* \* \* \*